(12) United States Patent
Nishitani et al.

(10) Patent No.: US 8,144,131 B2
(45) Date of Patent: Mar. 27, 2012

(54) DISPLAY DEVICE WITH TOUCH PANEL

(75) Inventors: Shigeyuki Nishitani, Mobara (JP); Hideo Sato, Hitachi (JP); Teruaki Saito, Mobara (JP); Norio Mamba, Kawasaki (JP)

(73) Assignees: Hitachi Displays, Ltd., Chiba-Ken (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 889 days.

(21) Appl. No.: 12/213,045

(22) Filed: Jun. 13, 2008

(65) Prior Publication Data

US 2009/0009487 A1 Jan. 8, 2009

(30) Foreign Application Priority Data

Jul. 3, 2007 (JP) ................................. 2007-175075

(51) Int. Cl.
*G06F 3/045* (2006.01)
(52) U.S. Cl. ..................... 345/174; 178/18.06
(58) Field of Classification Search .................. 345/173, 345/174, 104; 178/18.01, 18.05–18.06, 20.01–20.04
See application file for complete search history.

(56) References Cited

U.S. PATENT DOCUMENTS

| | | | | |
|---|---|---|---|---|
| 4,680,429 A * | 7/1987 | Murdock et al. | ........... | 178/20.02 |
| 7,000,474 B2 * | 2/2006 | Kent | ................ | 73/579 |
| 2007/0222763 A1 * | 9/2007 | Spath | ........................... | 345/173 |
| 2007/0262966 A1 | 11/2007 | Nishimura et al. | | |

FOREIGN PATENT DOCUMENTS

| | | | |
|---|---|---|---|
| JP | 05-324168 | | 12/1993 |
| JP | 07219708 A | * | 8/1995 |
| JP | 2002278690 A | * | 9/2002 |

* cited by examiner

*Primary Examiner* — Stephen Sherman
(74) *Attorney, Agent, or Firm* — Stites & Harbison, PLLC; Juan Carlos A. Marquez, Esq.

(57) ABSTRACT

Provided is a display device with a touch panel having the cost thereof reduced without a decrease in the transmittance ratio of light. A substrate has a planar transparent conductive film formed on an observer side thereof. The transparent conductive film is used as a transparent electrode of an electrostatic capacitance coupling type touch panel. A position detection pulsating voltage production circuit that inputs a pulsating voltage for position detection, and a coordinate position arithmetic circuit that computes a touched position on the transparent conductive film touched with an observer's finger are included. The transparent conductive film is shaped to have four corners. The position detection pulsating voltage generation circuit applies the position detection pulsating voltage to each of the four corners of the transparent conductive film at different timings. When the position detection pulsating voltage is applied to one of the four corners of the transparent conductive film, the coordinate position arithmetic circuit computes the touched position on the transparent conductive film, which is touched with the observer's finger, on the basis of a voltage outputted through the corner diagonally opposite to the corner to which the pulsating voltage is applied.

9 Claims, 6 Drawing Sheets

DISPLAY DEVICE WITH TOUCH PANEL

The present application claims priority from Japanese applications JP2007-175075 filed on Jul. 3, 2007, the content of which is hereby incorporated by reference into this application.

BACKGROUND OF THE INVENTION

1. Field of the Invention

The present invention relates to a display device with a touch panel, or more particularly, to a display device with a touch panel that includes an electrostatic capacitance coupling type touch panel facility and that have a high transmittance ratio realized.

2. Description of the Related Art

In recent years, a touch panel technology that supports human-conscious graphical user interfaces has played a pivotal role in prevalence of mobile equipment.

As the touch panel technology, electrostatic capacitance coupling type touch panels have been known. The typical electrostatic capacitance coupling type touch panel includes a touch panel substrate having a conductive coating (transparent conductive film) formed on the surface of a glass substrate. When the touch panel is touched with a finger, position detection is carried out.

Also known is a liquid crystal display device with a touch panel that has the touch panel substrate attached to the surface of a liquid crystal display panel, and that performs an action associated with a menu item designated by touching a menu screen image, which is displayed on the liquid crystal display panel, with a finger (refer to a patent document 1).

Incidentally, the patent document 1 on a prior art relating to The invention is JP-A-2006-146895.

SUMMARY OF THE INVENTION

In the liquid crystal display device with a touch panel described in the patent document 1, an alternating signal is applied to the touch panel, which is coated with a transparent conductive film, through four corners thereof. A current flowing into a finger with which the touch panel is touched is detected in order to detect coordinates. For detection of the current, a voltage developed across a resistor disposed at each of the four corners of the touch panel in order to detect a current is detected and converted into a current.

However, the liquid crystal display device with a touch panel described in the patent document 1 poses problems described below.

(1) In order to preserve a current that flows into a finger with which the touch panel is touched, the transparent conductive film has to be thick in order to decrease a resistance. This degrades the transmittance of the touch panel.

(2) Four sets of circuits are needed in association with the four corners. Since four sets of a current detection circuit, a noise filter, and a sample and hold are needed, circuitry becomes complex.

The invention is intended to solve the problems underlying the related art. An object of The invention is to provide a display device with a touch panel having the cost thereof reduced without a decrease in the transmittance ratio of light.

The above object of The invention, the other object thereof, and the novel features thereof will be apparent from the description of this specification and the appended drawings.

Among inventions disclosed in the present application, typical inventions will be briefly described below.

(1) A display device with a touch panel including a substrate that has a planar transparent conductive film, which is used as a transparent electrode of an electrostatic capacitance coupling type touch panel, formed on the observer-side surface thereof includes: a position detection pulsating voltage production circuit that inputs a pulsating voltage for position detection; and a coordinate position arithmetic circuit that computes a touched position on the transparent conductive film touched with a finger of the observer. The transparent conductive film is shaped to have four corners. The position detection pulsating voltage production circuit applies the position detection pulsating voltage to each of the four corners of the transparent conductive film at different timings. When the position detection pulsating voltage is applied to one of the four corners of the transparent conductive film, the coordinate position arithmetic circuit computes the touched position on the transparent conductive film touched with the observer's finger on the basis of a voltage outputted through a corner diagonally opposite to the corner to which the pulsating voltage is applied.

(2) In (1), assume that one pair of diagonal corners of the transparent conductive film includes corners A and B, and the other pair of diagonal corners of the transparent conductive film includes corners C and D. In this case, the coordinate position arithmetic circuit computes the touched position on the transparent conductive film, which is touched with the observer's finger, on the basis of the time difference A-B between a time A during which when a pulsating voltage for position detection is applied to the corner A of the transparent conductive film, the voltage outputted through the corner B is retained at a predetermined voltage, and a time B during which when the position detection pulsating voltage is applied to the corner B of the transparent conductive film, the voltage outputted through the corner A is retained at a predetermined voltage, and the time difference C-D between a time C during which when the position detection pulsating voltage is applied to the corner C of the transparent conductive film, the voltage outputted through the corner D is retained at the predetermined voltage, and a time D during which when the position detection pulsating voltage is applied to the corner D of the transparent conductive film, the voltage outputted through the corner C is retained at the predetermined voltage.

(3) In (2), the position detection pulsating voltage to be applied to the corner A or C of the transparent conductive film is a pulsating voltage that varies from a first voltage level to a second voltage level. The position detection pulsating voltage to be applied to the corner B or D of the transparent conductive film is a pulsating voltage that varies from the second voltage level to the first voltage level.

(4) In (2) or (3), the coordinate position arithmetic circuit includes an integration circuit. The integration circuit integrates a predetermined current during the time A or C, releases the predetermined current during the time B or D, and outputs a voltage associated with the time difference A-B or C-D.

(5) In (4), the integration circuit includes an integration circuit A that integrates the predetermined current during the time A and releases the predetermined current during the time B, and an integration circuit B that integrates the predetermined current during the time C and releases the predetermined current during the time D.

(6) In (4) or (5), the position detection pulsating voltage production circuit applies the position detection pulsating voltage to each of the corners multiple times. The integration circuit outputs a voltage calculated by adding up voltages associated with the time differences A-B or time differences C-D obtained by applying the position detection pulsating voltage to each of the corners multiple times.

(7) In any of (4) to (6), the coordinate position arithmetic circuit includes an analog-to-digital (A/D) conversion circuit connected on a stage succeeding the integration circuit.

An advantage provided by the typical ones of the inventions disclosed in the present application will be briefly described below.

According to a display device with a touch panel in which The invention is implemented, the transmittance ratio of light is not decreased but the cost can be reduced.

DESCRIPTION OF THE PREFERRED EMBODIMENTS

Figure 1A:
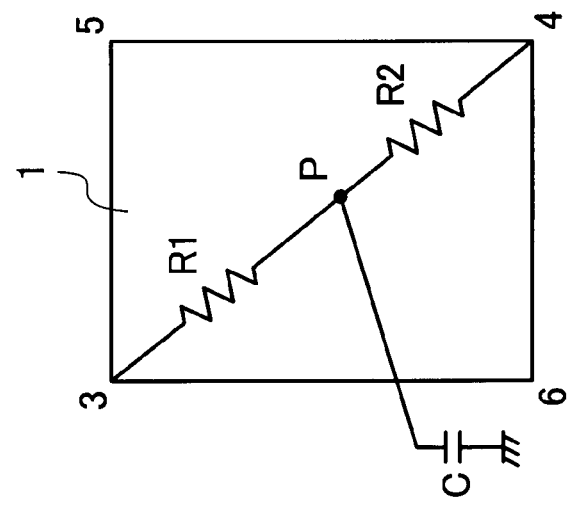
FIG. 1A to FIG. 1E are explanatory diagrams concerning the principles of position detection on a touch panel included in a liquid crystal display device with a touch panel in accordance with The invention.

Referring to the drawings, an embodiment having the invention applied to a liquid crystal display device will be described below.

Incidentally, in all the drawings that will be referenced in order to explain the embodiment, the same reference numerals will be assigned to components sharing the same capabilities. An iterative description will be omitted.

FIG. 1A to FIG. 1E are explanatory diagrams concerning the principles of position detection on a touch panel included in a liquid crystal display device with a touch panel in accordance with the invention.

In FIG. 1A, there is shown a touch panel 1 coated with a transparent conductive film. When a point P on the touch panel 1 shown in FIG. 1A is touched with an observer's finger, it means that a capacitive element C is inserted between the point P on the touch panel 1 and a reference potential (GND) point.

Figure 1B:
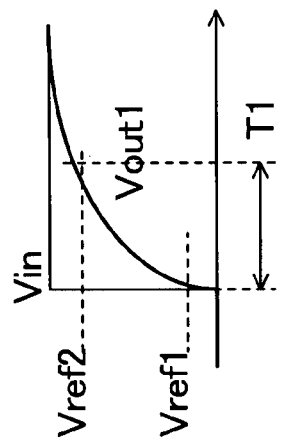
Figure 1C:
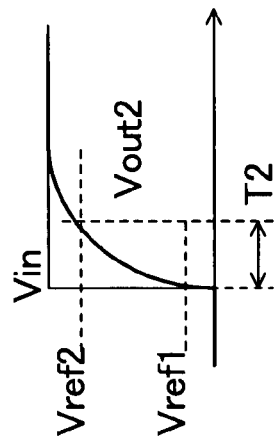

In this state, a pulsating voltage Vin is applied from a pulsating voltage production circuit 2 to a corner 3 out of the four corners of the touch panel 1. A rise time during which a pulsating voltage outputted through a corner 4 diagonally opposite to the corner 3 of the touch panel 1 rises from a predetermined voltage Vref1 to a predetermined voltage Vref2 is measured. FIG. 1B shows an equivalent circuit of the touch panel 1 in this state, and FIG. 1C shows the rise time of the pulsating voltage outputted through the corner 4 of the touch panel 1. In FIG. 1C, Vout1 denotes the pulsating voltage outputted through the corner 4 of the touch panel 1, and T1 denotes the rise time.

Figure 1D:
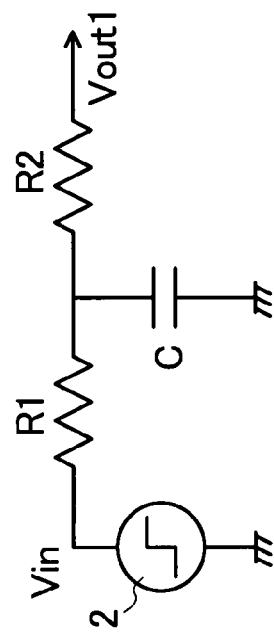
Figure 1E:
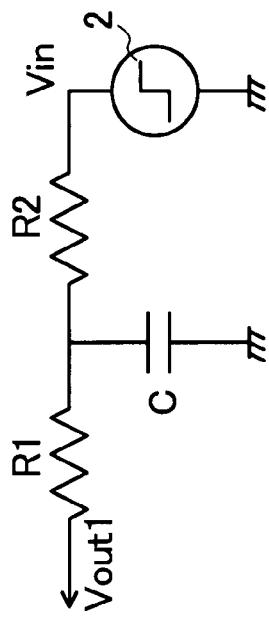

Thereafter, the pulsating voltage Vin is applied from the pulsating voltage production circuit 2 to the corner 4 of the touch panel 1. A rise time during which the pulsating voltage outputted through the corner 3 of the touch panel 1 rises from the predetermined voltage Vref1 to the predetermined voltage Vref2 is measured. FIG. 1D shows an equivalent circuit of the touch panel 1 in this state, and FIG. 1E shows the rise time of the pulsating voltage outputted through the corner 3. In FIG. 1B and FIG. 1D, R1 denotes an equivalent resistor interposed between the corner 3 of the touch panel 1 and the point P, and R2 denotes an equivalent resistor interposed between the corner 4 of the touch panel 1 and the point P. In FIG. 1E, Vout2 denotes the pulsating voltage outputted through the corner 3 of the touch panel 1, and T2 denotes the rise time.

Thereafter, the time difference between the times T1 and T2, that is, T1−T2 is calculated. When R1>R2 is established, T1>T2 is established. When R1=R2 is established, T1=T2 is established. When R1<R2 is established, T1<T2 is established.

Consequently, if the time difference T1−T2 is 0, the position touched with the observer's finger is recognized as the position of the center point on the touch panel 1 (a point at which the two diagonal lines intersect).

Moreover, if the time difference T1−T2 is a positive value, the position touched with the observer's finger is recognized as a position between the center point on the touch panel 1 and the corner 4. As the positive value of the time difference T1-T2 gets larger, the position touched with the observer's finger is a position closer to the corner 4.

Likewise, if the time difference T1−T2 is a negative value, the position touched with the observer's finger is recognized as a position between the center point on the touch panel 1 and the corner 3. As the negative value of the time difference T1−T2 gets smaller, the position touched with the observer's finger is a position closer to the corner 3.

The foregoing procedure is executed for the diagonal corners 5 and 6 of the touch panel 1, whereby the position on the touch panel touched with the observer's finger can be detected.

Figure 2:
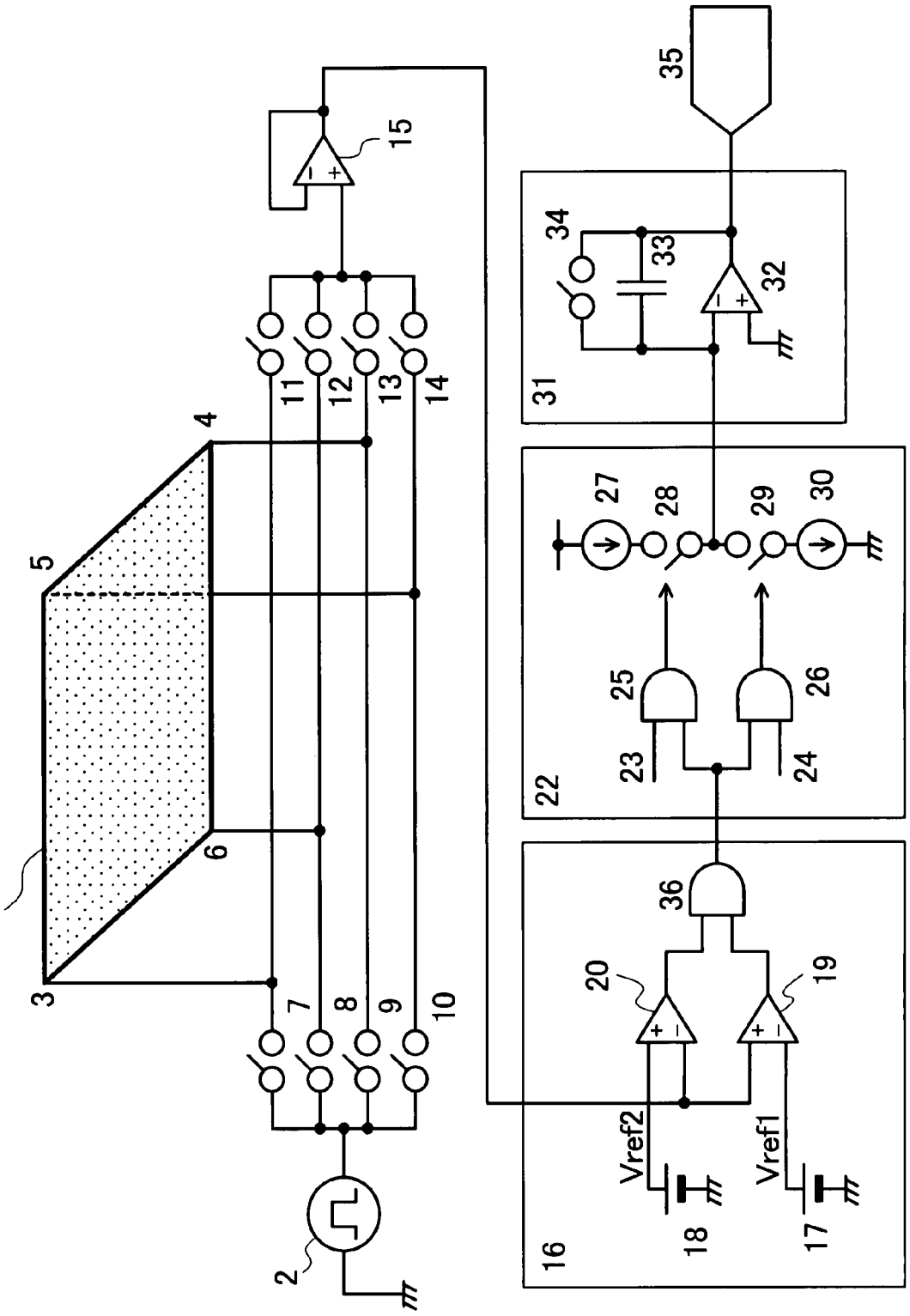
FIG. 2 shows the outline configuration of the touch panel included in the liquid crystal display device with a touch panel in accordance with the invention.
Figure 3:
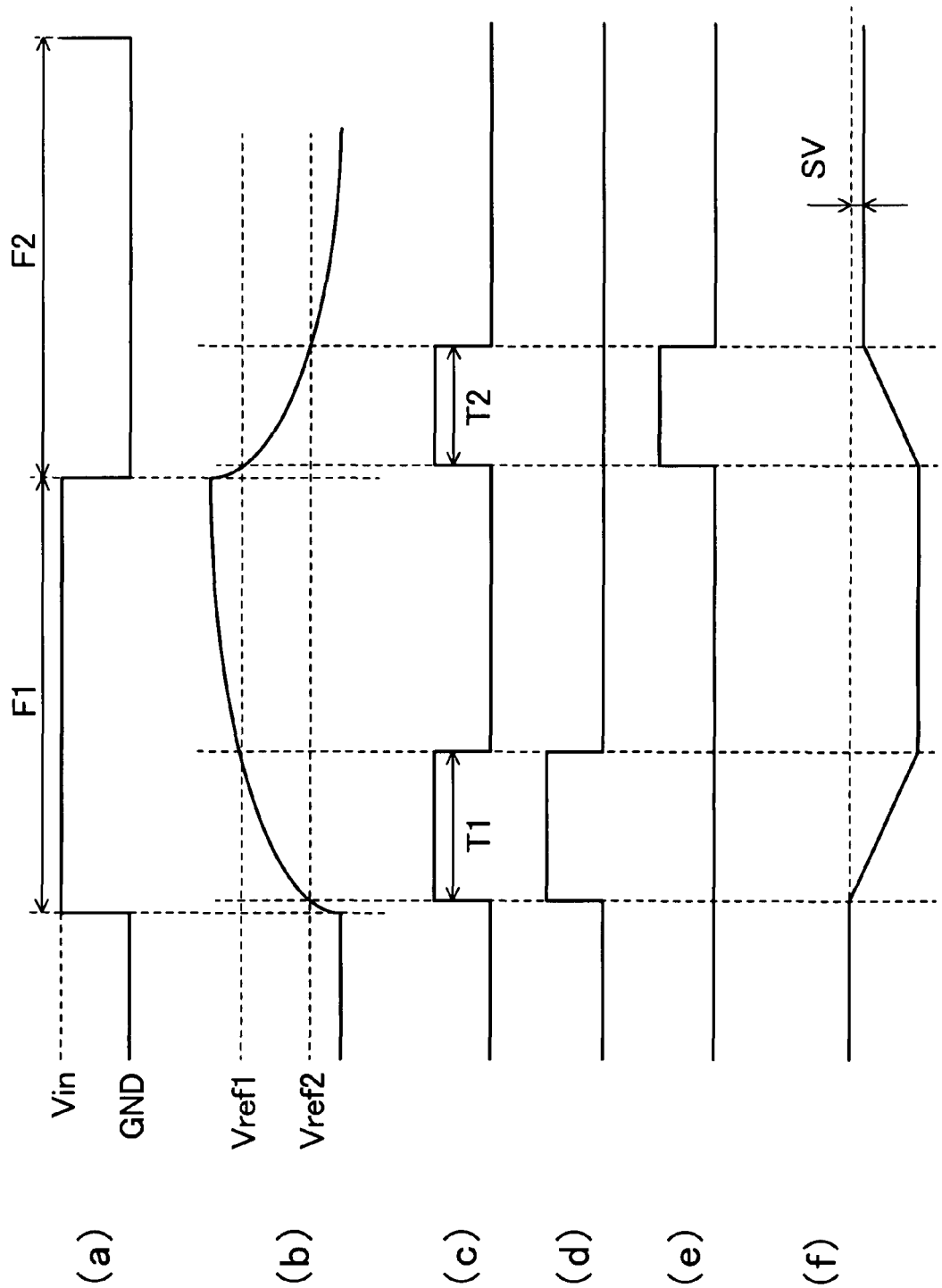
FIG. 3 is a timing chart showing waveforms of voltages to be applied to components shown in FIG. 2.

FIG. 2 shows the outline configuration of the touch panel included in the liquid crystal display device with a touch panel in accordance with the invention. FIG. 3 is a timing chart showing waveforms of voltages to be applied to components shown in FIG. 2.

The corners 3, 4, 5, and 6 of the touch panel 1 are connected to the pulsating voltage production circuit 2 via switches 7 to 10, and also connected to a buffer amplifier 15 via switches 11 to 14.

For example, during a cycle F1 shown in FIG. 3A, the switches 7 and 13 are turned on in order to apply a pulsating voltage (see (a) of FIG. 3) from the pulsating voltage production circuit 2 to the corner 3 of the touch panel 1. A pulsating voltage (see (b) of FIG. 3) that is outputted through the corner 4 of the touch panel 1 and rises at a predetermined time constant is inputted to a comparator circuit 16 via the buffer amplifier 15. The buffer amplifier 15 is intended to increase the impedance occurring on the buffer amplifier side beyond the corner 4 so as to prevent inflow of a current to the corner 4. Supposing a current flowed into the corner 4, the rise time of the pulsating voltage outputted through the corner 4 of the touch panel 1 would vary, and an error would occur in detection of a position on the touch panel 1.

The comparator circuit 16 converts the pulsating voltage, which is outputted through the corner 4 of the touch panel 1 and rises at the predetermined time constant, into a signal having a first pulse duration (T1 in (c) of FIG. 3).

The comparator circuit 16 includes a comparator 19 that inputs a reference voltage 17 of a voltage Vref1, a comparator 20 that inputs a reference voltage 18 of a voltage Vref2, and an AND circuit 36 that obtains the AND of the outputs of the comparators 19 and 20.

With the signal of the first pulse duration, a switch 28 included in a charge pump circuit 22 is turned on (see (d) of FIG. 3), and a current fed from a current source 27 is outputted to an integration circuit 31. According to the pulse duration (T1 in (c) of FIG. 3) of a signal that has the first pulse duration and is inputted to the integration circuit 31, a capacitor 33 connected between the inverting terminal of an operational amplifier 32 included in the integration circuit 31 and the output terminal thereof is charged. When the pulse duration of the signal having the first pulse duration is long, a magnitude of charging is large. When the pulse duration is short, the magnitude of charging is small.

Incidentally, the charge pump circuit 22 includes AND circuits 25 and 26. When a control signal 23 is high, if the output of the comparator circuit 16 is also high, the AND circuit 25 turns a switch 28 on. When a control signal 24 is high, if the output of the comparator circuit 16 is also high, the AND circuit 26 turns a switch 29 on.

Thereafter, during a cycle F2 shown in (a) of FIG. 3, the switches 9 and 11 are turned on in order to apply a pulsating voltage (see (a) of FIG. 3) from the pulsating voltage production circuit 2 to the corner 4 of the touch panel 1. A pulsating voltage (see (b) of FIG. 3) that is outputted through the corner 4 of the touch panel 1 and falls at a predetermined time constant is inputted to the comparator 16 via the buffer amplifier 15.

The rise time during which when a pulsating voltage that varies from the reference voltage (GND) to the voltage Vin is applied to the resistor R2 in the circuitry shown in FIG. 1D, the pulsating voltage rises from the predetermined voltage Vref1 to the predetermined voltage Vref2 is identical to the fall time during which when a pulsating voltage that varies from the voltage Vin to the reference voltage (GND) is applied to the resistor R2 in the circuitry shown in FIG. 1D, the pulsating voltage falls from the predetermined voltage Vref2 to the predetermined voltage Vref1. In FIG. 2, therefore, the pulsating voltage that varies from the voltage Vin to the reference voltage (GND) is applied to the corner 4 of the touch panel 1.

The comparator circuit 16 converts the pulsating voltage, which is outputted through the corner 4 of the touch panel 1 and falls at the predetermined time constant, into a signal having a second pulse duration (T2 in (c) of FIG. 3).

With the signal having the second pulse duration, the switch 29 included in the charge pump circuit 22 is turned on (see (e) of FIG. 3), and a current fed from a current source 30 is outputted to the integration circuit 31. Consequently, according to the pulse duration (T2 in (c) of FIG. 3) of the signal having the second pulse duration, charge is released from the capacitor 33 in the integration circuit 31. When the pulse duration of the signal having the second pulse duration is long, a magnitude of discharging is large. When the pulse duration is short, the magnitude of discharging is large.

After the foregoing procedure is followed, the output voltage SV of the integration circuit 31 (see (f) of FIG. 3) is converted into a digital form by the A/D converter 35.

When the output of the integration circuit 31 is a voltage of negative polarity, it means that the observer's finger with which the touch panel 1 is touched lies near the corner 4. In contrast, when the output of the integration circuit 31 is a voltage of positive polarity, it means that the observer's finger lies near the corner 3. When the output of the integration circuit 31 is zero, it means the observer's finger is brought into contact with a point whose distances from the corners 3 and 4 respectively are nearly equal to each other.

Consequently, the output voltage of the integration circuit 31 represents the relationship between the distances of the observer's finger from the corners 3 and 4 respectively of the touch panel 1. When the output voltage is converted into a digital form, the coordinates representing the point between the corners 3 and 4 touched with the finger can be obtained.

Thereafter, after a switch 34 included in the integration circuit 31 is turned on and the capacitor 33 is reset, a pulsating voltage is, as mentioned above, applied to each of the corners 5 and 6 of the touch panel 1. A pulsating voltage that rises at a predetermined time constant and develops at the other diagonal corner or a pulsating voltage that falls at a predetermined time constant is converted into a signal having a certain pulse duration. According to the same method as the aforesaid one, coordinates representing a point touched with an observer's finger can be obtained between the corners 5 and 6. Consequently, the position on the touch panel 1 touched with the observer's finger can be identified.

When the output voltage of the integration circuit 31 is converted into a digital form by the A/D converter 35, the actions shown in (a) of FIGS. 3 to (f) thereof may be repeated multiple times in order to increase the voltage to be sent from the integration circuit 31. Thereafter, the voltage may be converted into a digital form by the A/D converter 35.

Moreover, two sets of the buffer amplifier 15, comparator circuit 16, charge pump circuit 22, and integration circuit 31 may be prepared so that one set will be associate with the corners 3 and 4 and the other set will be associated with the corners 5 and 6.

As mentioned above, in the present embodiment, since a pulsating voltage is alternately applied to the diagonal corners of the touch panel 1, noise generated in the touch panel 1 can be canceled. Thus, a touch panel unsusceptible to noise can be realized.

In particular, when the invention is applied to a display device having an input facility integrated into a liquid crystal display panel or an electroluminescence (EL) panel, the input facility unsusceptible to noise generated by the liquid crystal display panel or EL panel can be realized.

Further, since the present embodiment can be easily constituted with a switch circuit, a comparator, a charge pump, and an integration circuit, the cost can be minimized.

Moreover, in the present embodiment, a pulse duration depending on the position of an observer's finger with which the touch panel 1 is touched (or the position of a stylus), a resistance proportional to the distance from a corner to which a pulsating voltage is applied, and a pulse width corresponding to an electrostatic capacitance provided by the observer's finger is measured. Therefore, the thickness of the transparent conductive film coated over the touch panel 1 can be reduced in order to increase a resistance. As a result, the transmittance of the touch panel 1 can be improved.

As one of liquid crystal display devices, an in-plane switching (IPS) type liquid crystal display device is known. In the IPS type liquid crystal display device, pixel electrodes and an opposite electrode are formed in the same substrate, and an electric field is applied between the pixel electrodes and an opposite electrode so that liquid crystalline molecules will be rotated on the substrate plane in order to control a contrast. Consequently, the IPS type liquid crystal display device has a feature that the shades of a display image are not inverted when the screen is seen obliquely.

In an IPS type liquid crystal display device, similarly to a twisted nematic (TN) type liquid crystal display device or a vertical alignment (VA) type liquid crystal display device, an opposite electrode does not exist on a substrate on which a color filter is disposed. For reasons of minimizing display noise or the like, a reverse-surface side transparent conductive film is formed on the substrate on which the color filter is disposed.

When the reverse-surface side transparent conductive film is used as a transparent electrode of the touch panel 1 included in the present embodiment, the liquid crystal display device can be constituted without an increase in the cost. Further, the transmittance ratio of the liquid crystal display device can be equalized to that of the conventional IPS type liquid crystal display device.

A description will be made of an example of a liquid crystal display device that uses the reverse-surface side transparent conductive film as the transparent electrode of the touch panel 1 included in the present embodiment.

Figure 4:
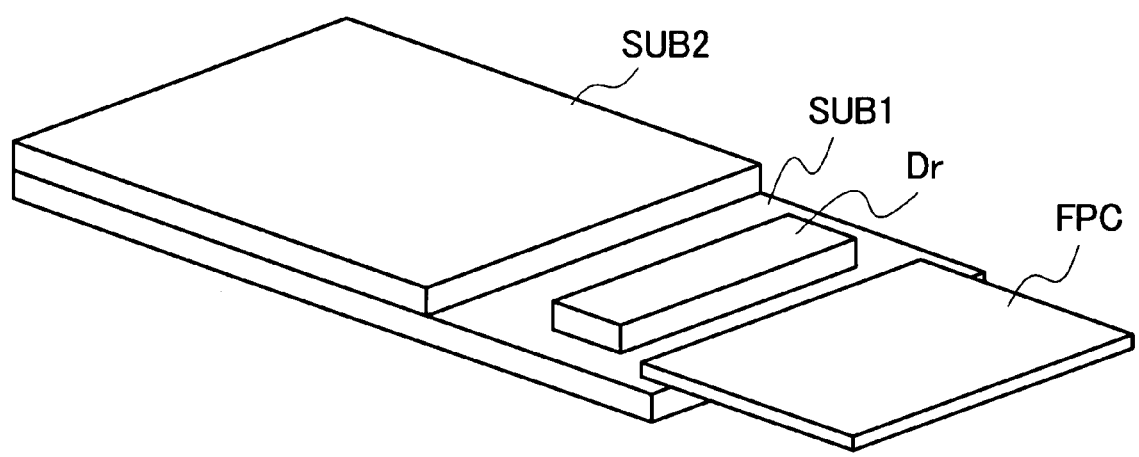
FIG. 4 is a block diagram showing the outline construction of a liquid crystal display device with a touch panel in accordance with an embodiment of the invention.

FIG. 4 is a block diagram showing the outline constitution of an example of a liquid crystal display device that uses the reverse-surface side transparent conductive film as the transparent electrode of the touch panel 1 included in the present embodiment. A liquid crystal display device with a touch panel shown in FIG. 4 is a compact liquid crystal display device to be adopted as a display unit of a portable cellular phone or a digital camera, etc.

The liquid crystal display device shown in FIG. 4 is constructed by: layering a first substrate SUB1 (which may be referred to as a TFT substrate or an active matrix substrate) in which pixel electrodes and thin-film transistors are formed, and a second substrate SUB2 (which may be referred to as an opposite substrate), in which a color filter or the like is formed, with a predetermined space between them; bonding the substrates using a sealant applied in the form of a frame near the margins of the substrates; injecting a liquid crystal into the inside of the sealant between the substrates through a liquid crystal injection port formed in part of the sealant; sealing the liquid crystal; and bonding a polarizer to each of the external sides of the substrates.

Thus, the liquid crystal display device shown in FIG. 4 is structured to have the liquid crystal sandwiched between the pair of substrates.

Moreover, the first substrate SUB1 has a larger area than the second substrate SUB2 does. A semiconductor chip Dr that realizes a driver which drives the thin-film transistors is mounted in an area on the first substrate SUB1 which is not opposed to the second substrate SUB2. A flexible printed wiring substrate (FPC) is mounted perimetrically on one side of the area.

Figure 5:
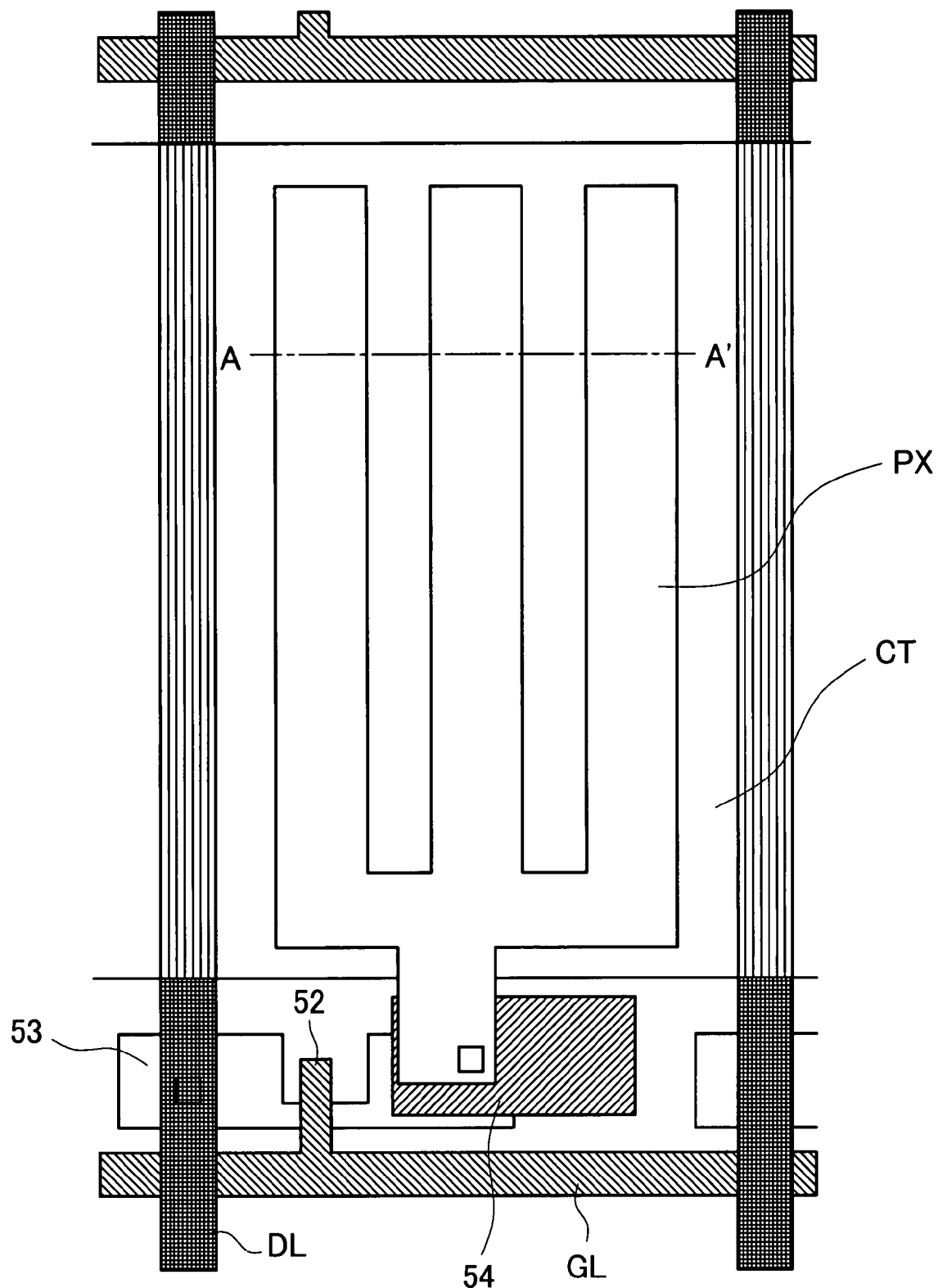
FIG. 5 is a plan view showing the construction of one subpixel in a liquid crystal display device included in the embodiment of the invention.

FIG. 5 is a plan view showing the construction of one sub-pixel in the liquid crystal display device shown in FIG. 4.

Figure 6:
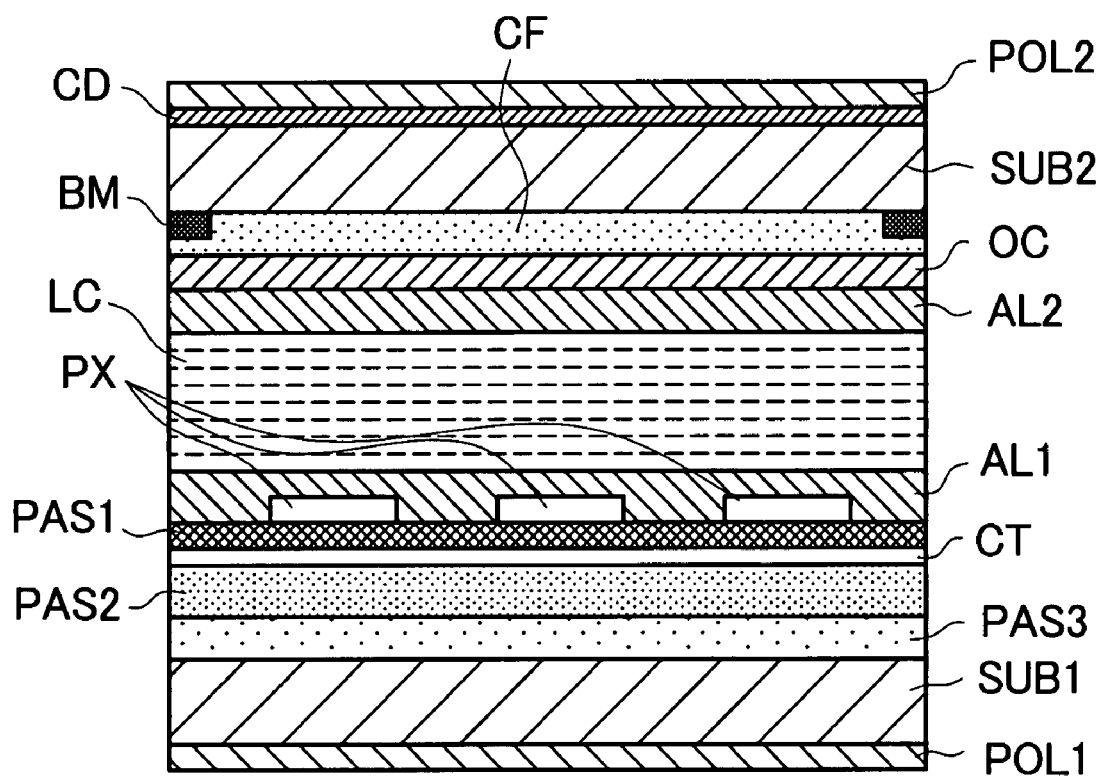
FIG. 6 is a sectional view showing the sectional structure along an A-A' cutting-plane line shown in FIG. 5.

FIG. 6 is a sectional view showing a sectional structure along an A-A' cutting-plane line shown in FIG. 5. Referring to FIG. 5 and FIG. 6, the structure of the liquid crystal display device shown in FIG. 4 will be described below.

The liquid crystal display device of the present embodiment is an IPS type liquid crystal display device that employs a planar opposite electrode, and has the main surface of the second substrate SUB2 thereof disposed on an observation side.

On the liquid crystal layer LC side of the second substrate SUB2 formed with a transparent substrate such as a glass substrate or a plastic substrate, a light interceptive film BM, a color filter layer CF, an overcoat layer OC, and an alignment film AL2 are formed in that order from the second substrate SUB2 to the liquid crystal layer LC. Further, a reverse-surface side transparent conductive film CD and a polarizer POL2 are formed on the external side of the second substrate SUB2.

Moreover, on the liquid crystal layer LC side of the first substrate SUB1 formed with a transparent substrate such as a glass substrate or a plastic substrate, scan lines (which may be called gate lines) GL (not shown), an interlayer insulating film PAS3, video lines (which may be called drain lines and source lines) DL (not shown), an interlayer insulating film PAS2, a planar opposite electrode CT, an interlayer insulating film PAS1, and pixel electrodes PX formed with pectinate electrodes, and an alignment film AL1 are formed in that order from the first substrate SUB1 to the liquid crystal layer LC. Further, a polarizer POLL is formed on the external side of the first substrate SUB1.

Moreover, in FIG. 5, reference numeral 52 denotes a gate electrode, 53 denotes a semiconductor layer, and 54 denotes a source electrode.

In the liquid crystal display device shown in FIG. 4, the reverse-surface side transparent conductive film CD is used as a transparent electrode of an electrostatic capacitance coupling type touch panel in order to realize a touch panel facility. Consequently, the reverse-surface side transparent conductive film CD shown in FIG. 4 serves as the transparent electrode of the touch panel 1 shown in FIG. 2. In the structure shown in FIG. 6, the polarizer POL2 is disposed on the reverse-surface side transparent conductive film. When the polarizer POL2 is insulating, when an observer touches the polarizer POL2 with his/her finger, the observer's finer may not function as a capacitor. In this case, a polarizer having conductivity is adopted as the polarizer POL2.

Moreover, the pulsating voltage production circuit 2, switching elements 7 to 14, buffer amplifier 15, comparator circuit 16, charge pump circuit 22, integration circuit 31, and A/D converter 35 may be mounted on the semiconductor chip Dr shown in FIG. 4, or may be disposed outside (herein, in the body of a portable cellular phone).

As described above, according to the liquid crystal display device shown in FIG. 4, a liquid crystal display device that makes the most of the features of the IPS type liquid crystal display device, realizes a low cost and a high transmittance, and includes an electrostatic capacitance coupling type touch panel can be provided. Specifically, since the reverse-surface side transparent conductive film CD is used as the transparent electrode of the electrostatic capacitance coupling type touch panel, the necessity of including another glass substrate (that is, a touch panel substrate) is obviated. Consequently, a decrease in a transmittance can be prevented. Further, an increase in a cost can be suppressed.

Moreover, since the liquid crystal display device shown in FIG. 4 need not include another glass substrate (that is, a touch panel substrate), the thickness of the liquid crystal display device can be decreased. Moreover, the liquid crystal display device can be made lightweight.

The invention is not limited to the IPS type liquid crystal display device but may be applied to the TN type liquid crystal display device and VA type liquid crystal display device. However, in the case of the TN type liquid crystal display device, VA type liquid crystal display device, and other liquid crystal display devices that need not have a transparent conductive film formed on the side of the second substrate SUB2 opposite to the side thereof on which a liquid crystal is disposed, another transparent conductive film has to be formed.

Incidentally, the invention is not limited to liquid crystal display devices but can be applied to all types of display devices including an organic electroluminescence display device.

The invention made by the present inventor has been concretely described based on the embodiments. The invention is not limited to the embodiments but can be, needless to say, modified in various manners without a departure from the gist thereof.

What is claimed is:

1. A display device with a touch panel including a substrate that has a planar transparent conductive film formed on the surface thereof on an observer side, the transparent conductive film being used as a transparent electrode of an electrostatic capacitance coupling type touch panel, comprising:
 a position detection pulsating voltage production circuit that produces a pulsating voltage for position detection; and
 a coordinate position arithmetic circuit that computes a touched position on the transparent conductive film, wherein:
 the transparent conductive film is shaped to have four corners;
 the position detection pulsating voltage production circuit applies the pulsating voltage for position detection to each of the four corners of the transparent conductive film at different timings; and
 when the pulsating voltage for position detection is applied to one of the four corners of the transparent conductive film, the coordinate position arithmetic circuit computes the touched position on the transparent conductive film on the basis of a rise time of a voltage outputted through a corner diagonally opposite to the one of the four corners to which the pulsating voltage is applied.

2. The display device with a touch panel according to claim 1, wherein:
 assuming that one pair of diagonal corners of the transparent conductive film includes corners A and B and the other pair of diagonal corners thereof includes corners C and D, the coordinate position arithmetic circuit computes the touched position on the transparent conductive film on the basis of the time difference A-B between the time A during which when the pulsating voltage for position detection is applied to the corner A of the transparent conductive film, the voltage outputted through the corner B is retained at a predetermined voltage, and the time B during which when the pulsating voltage for position detection is applied to the corner B of the transparent conductive film, the voltage outputted through the corner A is retained at a predetermined voltage, and the time difference C-D between the time C during which when the pulsating voltage for position detection is applied to the corner C of the transparent conductive film, the voltage outputted through the corner D is retained at the predetermined voltage, and the time D during which when the pulsating voltage for position detection is applied to the corner D of the transparent conductive film, the voltage outputted through the corner C is retained at the predetermined voltage.

3. The display device with a touch panel according to claim 2, wherein:
 the pulsating voltage for position detection applied to the corner A or C of the transparent conductive film is a pulsating voltage that varies from a first voltage level to a second voltage level; and
 the pulsating voltage for position detection applied to the corner B or D of the transparent conductive film is a pulsating voltage that varies from the second voltage level to the first voltage level.

4. The display device with a touch panel according to claim 2, wherein:
 the coordinate position arithmetic circuit includes an integration circuit;
 the integration circuit integrates the predetermined current during the time A or C, releases the predetermined current during the time B or D, and thus outputs a voltage associated with the time difference A-B or C-D.

5. The display device with a touch panel according to claim 4, wherein the integration circuit includes an integration circuit A that integrates the predetermined current during the time A and releases the predetermined current during the time B, and wherein the integration circuit A integrates the predetermined current during the time C and releases the predetermined current during the time D.

6. The display device with a touch panel according to claim 4, wherein:
 the position detection pulsating voltage production circuit applies the pulsating voltage for position detection to each of the four corners a plurality of times;
 the integration circuit outputs a voltage obtained by adding up voltages associated with time differences A-B or C-D calculated by applying the pulsating voltage for position detection to each of the four corners a plurality of times.

7. The display device with a touch panel according to claim 4, wherein the coordinate position arithmetic circuit includes an A/D conversion circuit connected on a stage succeeding the integration circuit.

8. The display device with a touch panel according to claim 1, wherein the display device is an IPS type liquid crystal display device.

9. The display device with a touch panel according to claim 8, further comprising a conductive polarizer disposed on the transparent conductive film.

* * * * *